United States Patent [19]

Lisec

[11] Patent Number: 4,667,555
[45] Date of Patent: May 26, 1987

[54] GLASS CUTTING TABLE

[76] Inventor: Peter Lisec, Bahnhofstrasse 34, 3363 Amstetten-Hausmening, Austria

[21] Appl. No.: 771,233

[22] Filed: Aug. 29, 1985

[30] Foreign Application Priority Data

Feb. 25, 1985 [AT] Austria .................................. 556/85

[51] Int. Cl.$^4$ .......................... C03B 33/10; B26D 3/08
[52] U.S. Cl. .......................................... 83/879; 83/319
[58] Field of Search .......................... 83/879, 880–887, 83/152, 98–100, 319, 294

[56] References Cited

U.S. PATENT DOCUMENTS

| | | | |
|---|---|---|---|
| 3,253,756 | 5/1966 | Haley et al. | 83/879 X |
| 3,613,974 | 3/1969 | Chatelain | 83/879 X |
| 4,127,198 | 11/1978 | Morini | 83/152 X |
| 4,140,258 | 2/1979 | Gray | 83/152 X |

FOREIGN PATENT DOCUMENTS

| | | |
|---|---|---|
| 1234947 | 12/1963 | Fed. Rep. of Germany . |
| 1296318 | 5/1969 | Fed. Rep. of Germany . |
| 3038676 | 6/1982 | Fed. Rep. of Germany . |
| 1040514 | 8/1966 | United Kingdom . |
| 986879 | 7/1981 | U.S.S.R. . |

*Primary Examiner*—James M. Meister
*Attorney, Agent, or Firm*—Young & Thompson

[57] ABSTRACT

At least two carriers (12, 13) are provided at the cross cutter (4) of a glass cutting table (1), these carriers, after termination of the scoring operation, being brought into contact with a glass sheet (2) and push the latter away from the glass cutting table (1). Ordinarily, at least one of the carriers (suction cups 12, 13) is movable in the direction of the longitudinal extension of the cross cutter (4).

2 Claims, 1 Drawing Figure

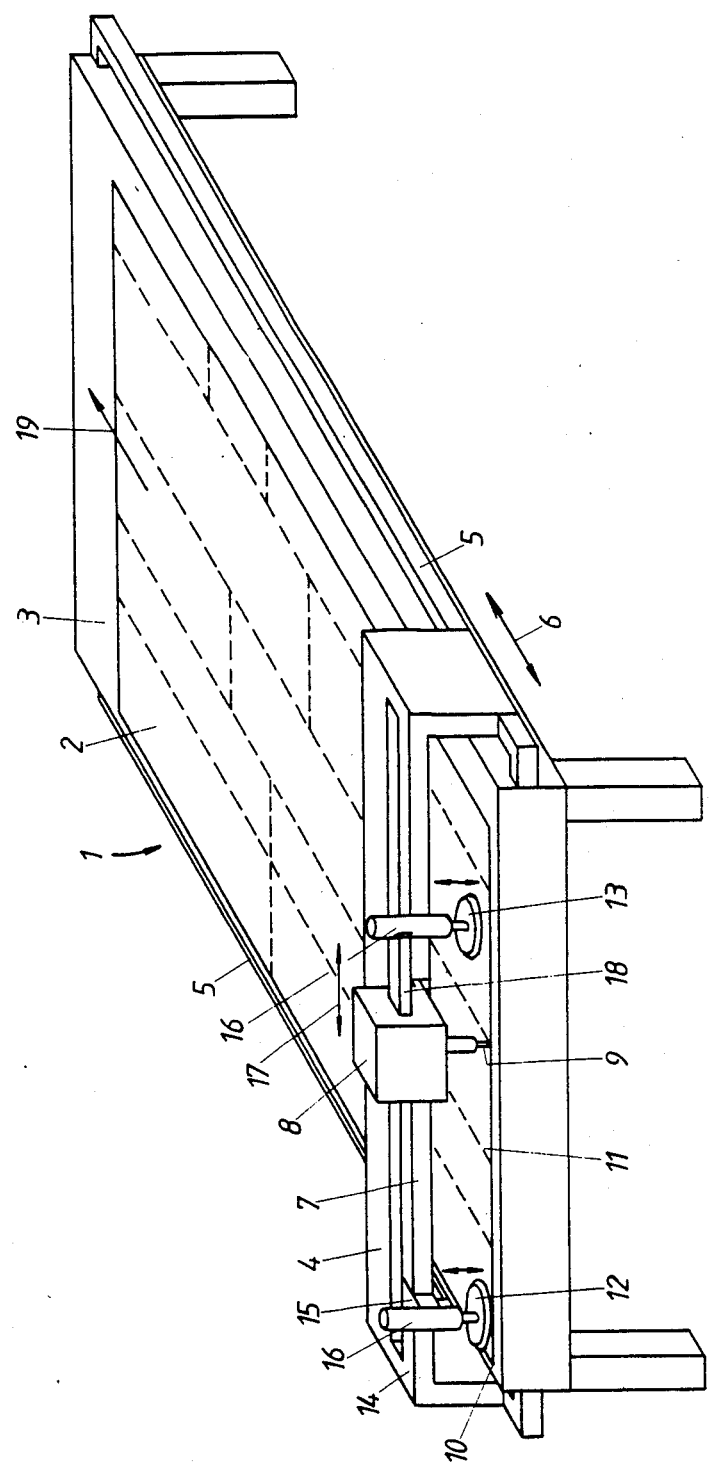

GLASS CUTTING TABLE

The invention relates to a glass cutting table with a movable cross cutter at which a movable cutting head is provided.

Such cutting tables, for transporting the glass sheets, have conveyor belts that can be lowered in their surface, these belts conveying the glass sheets in the direction of the longitudinal extension of the cutting tables, which latter have a length of up to about 7 meters. These conveying means, designed as conveyor belts, exhibit several drawbacks. On the one hand, an expensive structure is required for their operation and support over a comparatively large length (up to 7 meters). Moreover, there is the danger when transporting away already scored glass sheets, especially in case of thin sheet glass, that a glass sheet will break prematurely in the region of a notched score if a conveyor belt engages directly beneath a notched score and the glass sheet sags between the individual conveyor belts. Therefore, it has been necessary to provide a maximum number of conveyor belts in the surfaces of glass cutting tables whereby expenses were increased even more.

The invention is based on the object of providing a conveying means for glass cutting tables wherein the glass sheets can be moved along on the glass cutting table and, in particular, can be gently moved away therefrom after scoring. In this connection, the surface of the table is to be designed if at all possible without interruptions, and moving means present at the glass cutting table are to be utilized.

This object has been attained according to the invention by providing at the cross cutter at least two carriers that can be brought into contact with the glass sheet from above, preferably at least one of these carriers being movable in the direction of the longitudinal extension of the cross cutter.

Due to the fact that carriers that can be brought into contact with the glass sheets are arranged at the cross cutter in accordance with this invention, the glass sheet can be pushed away from the glass cutting table without any problems after finishing of the scoring operation. No additional drive motors whatsoever are required for operating the carriers, which latter, together with the cross cutter, serve as the conveying means, since the cross cutter is designed anyway to be movable in the longitudinal direction of the table. On account of the fact that additionally preferably at least one of the carriers is movable in the longitudinal extension of the cross cutter, the carrier can be positioned so that it engages in between adjacent notched scores at the glass sheet; consequently, there is no danger of breakage whatever, even in case of thin sheet glass, during transporting (pushing the glass sheet away from the glass cutting table, for example to a snapping-off table, etc.).

In order to facilitate pushing away of the glass sheet from the cutting table, the provision can be made within the scope of this invention that the surface of the table is fashioned as a sliding surface. In a special embodiment, this sliding surface can be realized by arranging air exhaust ports in the table surface, which ports can be connected to a source of compressed air to form an air cushion between the table and a glass sheet disposed thereon.

Various embodiments of carriers are possible, such as, for example, pusher bars engaging the transverse edge of the glass sheet which is at the rear as seen in the conveying direction, and like devices. However, within the scope of this invention, an embodiment has proven itself especially well wherein suction cups that can be connected to at least one vaccum source are provided as the carriers.

According to one embodiment of the invention, the provision is made that a carrier is fixedly located at the cross cutter at the end of the latter adjacent to the reference point of the table. This is readily feasible since cutting tables have a reference point normally lying in a corner thereof, this reference point being the start for the program for the movements of the cutting head to score the glass sheet. Normally, no notched scores are provided in the region of this reference point, so that there is no danger of the fixed carrier (for example suction cup) engaging in the zone of a notched score at the glass sheet.

According to another embodiment of the invention, the provision is made that the movable carrier, or one of the movable carriers, is located at the cutting head or at the slide carriage of the latter. This structure has the advantage that no separate drive means are required for moving the carrier (for example the suction cup) in a zone of the glass sheet where no notched scoring is provided.

In the glass cutting table of this invention, various embodiments are thus possible with respect to the arrangement and number of carriers (suction cups). For example, two carriers are provided, both of which are rigidly connected to the cross cutter, or two carriers are provided, of which one is rigidly joined to the cross cutter and the other is movable, for example, with the cutting head along the cross cutter. However, it is also possible to provide two or more carriers which are all displaceable along the cross cutter transversely to the longitudinal extension of the table, etc.

Finally, the provision can be made within the scope of this invention that the carriers, especially the suction cups, can be lifted and lowered vertically by means of drive mechanisms, especially pressure medium cylinders. The drive motors will preferably be pneumatic cylinders, since the cutting head is connected with the source of compressed air, anyway, inasmuch as glass dust produced during scoring is usually blown away by means of compressed air. This pressurized air can also be utilized for producing the vacuum for the carriers, which latter are preferably designed as suction cups, by arranging one or several injectors as the vacuum sources.

Further details and features of the invention can be derived from the following description of the glass cutting table according to this invention illustrated schematically in the drawing.

For the sake of clarity, all drive mechanisms and supply lines have been omitted from the drawing.

A cutting table 1 for plate glass 2, resting on the surface 3 of the table 1, comprises a cross cutter 4 movable by way of guide means 5 by drive mechanisms, not shown, in the direction of the double arrow 6, i.e. in the direction of the longitudinal extension of the cutting table 1.

A cutting head 8 is provided at the cross cutter 4, movable on a guide 7 by means of a drive mechanism, not shown, transversely to the direction of the longitudinal extension of the cutting table 1. The cutting head 8 has a tool 9 that can be lifted and lowered, as well as pivoted, this tool producing notched scores 11 in the glass sheet 2 according to a predetermined program utilizing as reference a reference point 10 of the cutting table 1.

In the illustrated embodiment, two suction cups 12 and 13, serving as carriers for the glass sheet 2, are provided at the cross cutter 4. The suction cup 12 is arranged at the cross cutter 4 in the zone of its end 14 proximate to the reference point 10 and is connected to the cross cutter 4 by way of a holder 15 and a pressure medium cylinder (compressed-air cylinder) 16. The suction cup 12 is thus not movable in the direction of double arrow 17.

The suction cup 13 is connected to the cutting head 8 via a support 18 and a pressure medium cylinder 16 so that this suction cup is movable together with the cutting head 8 in the direction of double arrow 17.

The suction cups 12 and 13 can be lifted, during nonuse, off the surface of the glass sheet 2 by means of the pressure medium cylinders 16.

It is understood that, besides the two carriers illustrated in the embodiment, which are suction cups, for example, still further carriers, likewise fashioned, for example, as suction cups, can be provided at the cross cutter 4, which carriers are fixedly arranged and/or are movable together with the cutting head or independently of the latter.

After termination of the cutting work, i.e. once all notched scores 11 have been produced in the glass sheet 2, the scoring tool 9 of the cutting head 8 is lifted off the glass sheet 2. Thereupon the pressure medium motors 16 are activated so that the suction cups 12 and 13 contact the surface of the glass sheet 2. In this connection, care must be taken, especially in case of thin glass sheets, that the suction cups 12 and 13 will not come into contact in the zone of the scoring lines 11, but this is no problem inasmuch as the computer controlling the cutting head 8, the memory of which contains the locations where notched scores 11 have been produced, can also be utilized for controlling the movements of the cutting head 8 traveling in the direction of double arrow 17 when the suction cup 13 is to be aligned.

Thereupon the drive mechanism for the cross cutter 4 is set into motion, and the glass sheet 2 is pushed away from the cutting table 1 in the direction of arrow 19, for example toward a snapping-off table.

In order to facilitate this shifting of the glass sheet 2 on the surface 3 of the cutting table 1, this surface can be designed as a sliding surface. A measure that is especially suitable for this purpose resides in providing air exhaust ports in the surface 3, connectible to a source of compressed air, so that an air cushion can be produced between the glass sheet 2 and the surface 3 of the cutting table 1, for transporting the glass sheet away.

What is claimed is:

1. An elongated glass cutting table having a cross cutter thereon that is elongated in a direction transverse to the table and is supported at its ends for sliding movement lengthwise of the table, a cutter head slidable lengthwise on the cross cutter, the cutter head having a cutter tool for scoring glass sheets, the tool being adapted to be raised and lowered out of and into contact with a glass sheet carried by the table, and a pair of suction cups connectable to a vacuum source and serving as carriers for a glass sheet mounted on the cross cutter on opposite sides of the cutter head, at least one of said suction cups being mounted for movement lengthwise of the cross cutter, said suction cups being adapted to be raised and lowered out of and into contact with a glass sheet on the table, said at least one suction cup mounted for movement lengthwise of the cross cutter being connected to said cutter head for movement therewith.

2. A table according to claim 1, and air exhaust ports on the surfaces of the table connected to a source of compressed air for the formation of an air cushion between the table and a glass sheet disposed on the table.

* * * * *